July 24, 1962 F. M. POTGIETER 3,045,455
UNIVERSAL JOINT FOR SHAFTS
Filed Jan. 16, 1961
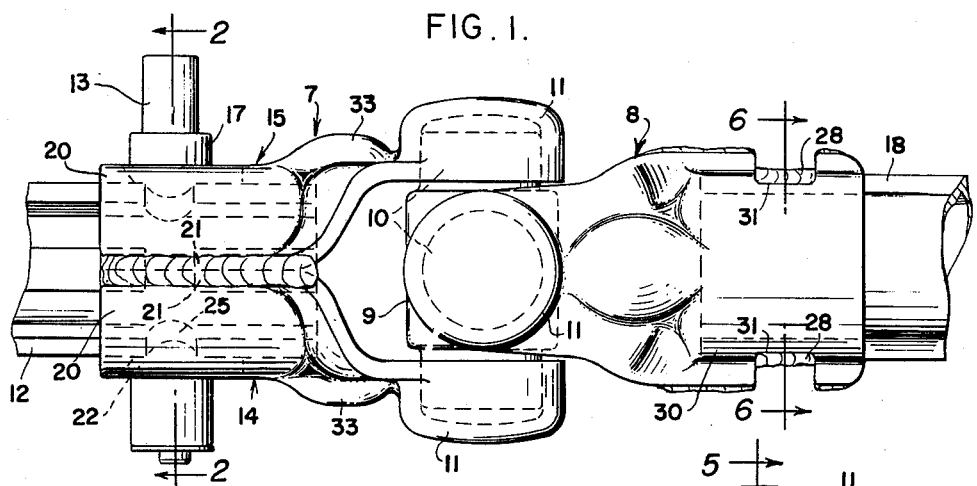
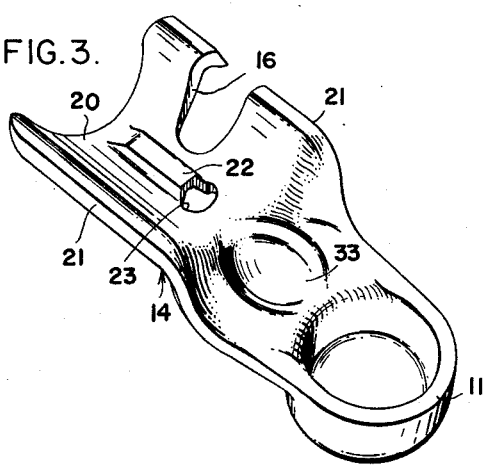
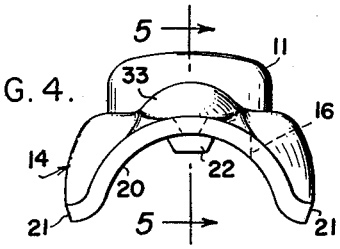
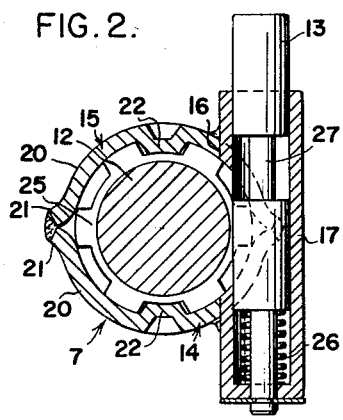
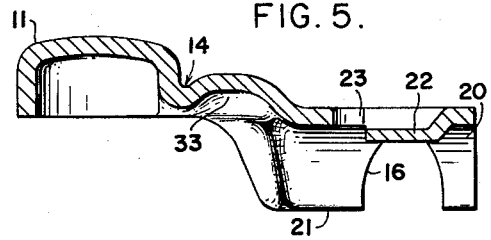
*INVENTOR.*
FRED M. POTGIETER
BY
*Ernst W. Schultz*
ATTORNEY United States Patent Office 3,045,455
Patented July 24, 1962

3,045,455
UNIVERSAL JOINT FOR SHAFTS
Fred M. Potgieter, Rockford, Ill., assignor to Chain Belt Company, Milwaukee, Wis., a corporation of Wisconsin
Filed Jan. 16, 1961, Ser. No. 82,842
6 Claims. (Cl. 64—17)

This invention relates to universal joints for shafts and particularly to the construction of the yokes having forked ends which are joined by a cross member and opposite hub ends which are attached to the shafts.

According to the present invention, each yoke comprises a pair of identical, stamped elements including semi-cylindrical portions which together form the hub of the yoke. The joined cylindrical portions may be variously formed to fit the ends of different types of shafts and may be secured thereto by welding or cross-pins of various types. The opposite ends of each element of each yoke form bearing cups which face each other and fit over the opposite pintles of the cross member which connects the two yokes. Each element is of unitary construction with the respective cup and hub portion joined by an arm. The invention is particularly directed to the configuration of the arm whereby the yoke is capable of carrying the primary and secondary forces which are components of the torque transmitted from one yoke to the other through the intermediate cross member.

The principal object of the invention is to provide such a yoke of stamped, unitary construction and of less cost.

Another object is to provide an improved joint of less weight or material.

The drawings furnished herewith illustrate the best mode of carrying out the invention as presently contemplated and set forth hereinafter.

In the drawings:

FIG. 1 is a side elevation of the joint connecting the ends of the two shafts shown. The hub on the shaft at the left is provided with internal spline means to engage the splines of the shaft. The yoke is secured thereon by the releasable pin at one side of the hub. The hub at the right is assembled on the end of a non-circular tube which is part of a telescoping drive shaft, not shown. The yoke is welded to the tube at the notches in the marginal flanges of the hub;

FIG. 2 is a section taken on line 2—2 of FIGURE 1 through the releasable pin securing the yoke on the splined shaft;

FIG. 3 is a perspective view of one of the two stamped elements comprising the yoke for the splined shaft and shows the cut-out for the tube which carries the releasable pin;

FIG. 4 is an end view of the element shown in FIG. 3;

FIG. 5 is a section taken on line 5—5 of FIG. 4; and

FIG. 6 is a section taken on line 6—6 of FIG. 1 showing the cross-section of the hub and the drive tube and the welds at the notches in the flanges of the hub securing the tube therein.

The universal joint shown in FIGURE 1 comprises the yokes 7 and 8 and the intermediate cross 9 having opposite pintles 10 fitting and turnable in the corresponding bearing cups 11 of yokes 7 and 8.

Yokes 7 and 8 comprise similar stamped elements which are welded together at the end forming the hub of each yoke. However, each hub as shown is differently formed according to the type and size of shaft it is to receive. The hub of yoke 7, as shown, is splined to receive the six-splined shaft 12 which is releasably secured therein by the pin 13.

The stamped elements 14 and 15 which comprise yoke 7 are identical except for the location of the slot 16 provided to receive the barrel 17 which carries the pin 13.

The releasable pin 13 is a standard coupling feature for farm implement drives and the like providing quick and easy attachment and disattachment of the drive shaft, and the light weight of the universal joint of the present invention is also an important factor contributing to this feature. Element 14 is shown in FIGS. 3–5 and comprises a single, stamped member which includes the bearing cup 11 at one end thereof and the semi-circular hub end 20 having parallel oppositely projecting marginal flanges 21.

The indentation 22 extending medially and inwardly of hub end 20 forms one of the internal splines to engage shaft 12 and terminates at the hole 23. Hole 23 and a corresponding hole in element 15 are not required in the joint shown in FIGURE 1 but are provided to receive an ordinary cross-pin, not shown, which is frequently used instead of pin 13.

The slot 16 in one side of hub end 20, as shown in FIG. 3 may be provided after stamping the elements 14, but is more readily provided in the blank, not shown, from which element 14 is formed. The latter method would be normally used in production of the joint in any commercial volume to provide the recess in the completed yoke 7 to receive the barrel 17 for pin 13.

As shown in FIG. 2, barrel 17 has a side opening so that only pin 13 extends into the circular internal dimensions of the hub. Pin 13 normally fits within the annular groove 25 of shaft 12 to secure the same in the hub. By pushing the projecting end of pin 13 and compressing spring 26 at the opposite end, the smaller intermediate portion 27 of pin 13 is moved opposite shaft 12 to allow the shaft to pass the pin for attachment and disattachment of yoke 7 from shaft 12.

The end of the tube 18 which is to drive, or be driven by, shaft 12 is secured in the hub of yoke 8 by welds 28 as shown in FIG. 6. The marginal flange 29 of the hub ends 30 of elements 19 comprising yoke 8 are welded together in a manner similar to that of yoke 7. However, flanges 29 are provided with the corresponding notches 31 so that the tube 18 is therein welded to the elements and the tube is then permanently fixed in the hub of yoke 8.

The present invention is embodied in both yokes 7 and 8 and particularly includes the configuration of the arms of the yokes, namely the intermediate portions of the elements which join the bearing cups 11 with the respective hubs.

In the operation of the universal joints, the torque must be transmitted in all angular positions of each yoke 7 and 8 with respect to the cross 9 within the required operating limits. This imposes stresses upon the arms of the yokes which are severe and cyclical so that the arms are extremely subject to fatigue failure which generally begins as a crack in the arm at the side which is under tension. The operating limits referred to also limit the dimensions of the arms so that the limitations in the thickness of the metal from which the cup 11 can be drawn have to date prevented the successful development of a stamped universal joint for such relatively heavy-duty use as the drive shaft connecting a farm tractor and the powered agricultural implement.

According to the present invention, the arm of the element 14 includes the deep, oval embossing 33 which projects outwardly of the completed yoke and extends from cup 11 to a point which is well within the general dimensions of the hub. The hub may be considered to extend the length of the abutting marginal flanges 21 of the elements 14 and 15 in the completed yoke 7.

The development of embossing 33 is based upon the trial of numerous configurations of the yokes tested. The embossing is deep in that it is in the order of one-half the depth of the cup and the embossing is about one-half the width of the arm. These are a general comparison but are applicable to joints of various sizes.

The embossing braces the bearing cup 11 and holds the cup against the radial force caused by the secondary torque in the universal joint. The force referred to pushes the bearing cup outwardly and tends to bend the arms of the joint outwardly.

The embossing also strengthens the arms against such bending by giving the arms a larger cross-section in the plane intersecting the axes of the hub and bearing cups. As shown in FIG. 5, the embossing extends partly to or into the bearing cup. According to the present invention, the embossing may extend further into the cup for additional bracing of the cup if required, or may extend up to the cup but appear separate thereof.

The elements comprising yokes 7 and 8 provide a stamped universal joint of large capacity and relatively light weight. The welding of the marginal flanges of the hubs completes each yoke and also secures yoke 8 on the end of tube 18.

Various embodiments of the invention may be employed within the scope of the accompanying claims.

I claim:

1. An element of stamped construction to form with a duplicate thereof, one of the two yokes of a universal joint including a center cross having oppositely disposed bearing pintles, one end of said element comprising a semi-cylindrical hub portion having parallel outwardly extending marginal flanges, the opposite end of the element being formed as a bearing cup to fit one of said pintles, the intermediate portion of the element forming one of the two arms of the yoke and having margins extending from said flanges to said cup, said intermediate arm portion having a relatively deep, outward embossing between said margins and extending from the cup and into said hub portion.

2. A universal joint for coupling the adjacent ends of two power shafts including a pair of yokes and a center cross having four pintles, each yoke having a hub for attachment to or securement over or within the corresponding end of one of said shafts and comprising two symmetrical stamped elements including: semi-cylindrical portions together forming the hub of the yoke, bearing cups fitting over opposite pintles, and parallel arms joining the respective cups and hub-portions, said hub portions having adjoining marginal flanges with welds joining the same and said hub portions and arms having centrally formed oppositely projecting embossments extending from the hub portions intermediate the marginal flanges thereof and to the cups of the respective arms whereby the arms are effectively reinforced against both the primary and secondary forces acting upon the joint at all operating angles.

3. Duplicate elements of stamped construction to form one or two yokes of a universal joint including a center cross having oppositely disposed bearing pintles, each said element including a semi-cylindrical hub portion at one end and having a bearing cup at the other end, said hub portion having opposite marginal flanges to be joined with the corresponding flanges of the other element to form the hub of the yoke with the bearing cups assembled and turnable on opposite pintles of the cross, the arm of the yoke joining the hub portion and the respective bearing cup having an outwardly projecting embossment extending from the bearing cup and into the hub portion, said embossment serving to enlarge the section of the arm in the plane intersecting the axis of the hub and bearing cups and to hold the bearing cup against secondary torque forces pushing the bearing cup outwardly.

4. A yoke for a universal joint comprising duplicate elements, each element being of stamped construction, one end of said element comprising a semi-cylindrical hub portion having parallel outwardly extending marginal flanges, the opposite end of the element being formed as a bearing cup to fit one of the pintles of the cross of the joint, the intermediate arm portion having a relatively deep outward embossing between said margins and extending from the cup and into said hub portion.

5. A universal joint for coupling the adjacent ends of two power shafts including a pair of yokes and a center cross having four pintles, each yoke having a hub for attachment to or securement over or within the corresponding end of one of said shafts and comprising two symmetrical stamped elements including: semi-cylindrical portions together forming the hub of the yoke, bearing cups fitting over opposite pintles, and parallel arms joining the respective cups and hub-portions, said hub portions having adjoining marginal flanges wtih welds joining the same and the marginal flanges of at least one yoke being provided with notches extending to the cylindrical hub portion to provide openings between elements at the base of each notch which allows the welds to be extended into the hub of said one yoke and to secure the end of a shaft assembled therein, said hub portions and arms having centrally formed oppositely projecting embossments extending from the hub portions intermediate the marginal flanges thereof and to the cups of the respective arms whereby the arms are effectively reinforced against both the primary and secondary forces acting upon the joint at all operating angles.

6. A shaft and yoke assembly, said yoke being for a universal joint and comprising stamped duplicate elements, one end of each element comprising a semi-cylindrical hub portion and the other end forming a bearing cup facing the corresponding cup of the other element of the yoke, the hub portion of the two elements having parallel marginal flanges in abutting relation, said marginal flanges having notches extending to the cylindrical hub portions to provide openings between elements at the base of each notch which allows for welds to be extended into the hub and to secure the end of the shaft assembled therein, and welds joining said flanges of the hub portions together and on said shaft to form a rigid yoke and assembly.

References Cited in the file of this patent
UNITED STATES PATENTS

| | | |
|---|---|---|
| 1,291,388 | Bright et al. | Jan. 14, 1919 |
| 2,067,282 | Padgett | Jan. 12, 1937 |
| 2,800,004 | Schroter | July 23, 1957 |
| 2,904,975 | Miller | Sept. 22, 1959 |
| 2,910,842 | Sensening | Nov. 3, 1959 |